(12) United States Patent
Wong

(10) Patent No.: US 8,264,464 B2
(45) Date of Patent: Sep. 11, 2012

(54) METHOD AND SYSTEM FOR ACTIVATING AN APPLICATION ON A PORTABLE ELECTRONIC DEVICE

(75) Inventor: Yoon Kean Wong, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 89 days.

(21) Appl. No.: 12/611,883

(22) Filed: Nov. 3, 2009

(65) Prior Publication Data
US 2011/0320982 A1   Dec. 29, 2011

Related U.S. Application Data

(63) Continuation of application No. 09/726,848, filed on Nov. 29, 2000, now Pat. No. 7,636,079.

(51) Int. Cl.
*G06F 3/02* (2006.01)

(52) U.S. Cl. ....................................... 345/169

(58) Field of Classification Search .................. 345/156, 345/179, 157–169; 715/810, 835; 455/566, 455/564; 348/734; 463/37–38; 200/11 R, 200/12–14
See application file for complete search history.

(56) References Cited

U.S. PATENT DOCUMENTS 5,706,456 A * 1/1998 Dupper et al. ................ 715/839
* cited by examiner

*Primary Examiner* — Abbas Abdulselam

(57) ABSTRACT

A method and system for activating an application on a portable electronic device are disclosed. A method of activating an application on a portable electronic device includes displaying a plurality of elements on a display device of the portable electronic device, wherein each element of the plurality of elements is associated with a respective application of a plurality of applications. In response to a first user interaction with a user interface component of the portable electronic device, changing an appearance of a first element of the plurality of elements, wherein the first element is associated with a first application of the plurality of applications. In response to a second user interaction with the user interface component, activating the first application. The first user interaction includes a user interaction along a first axis, and wherein the second user interaction includes a user interaction along a second axis.

18 Claims, 7 Drawing Sheets

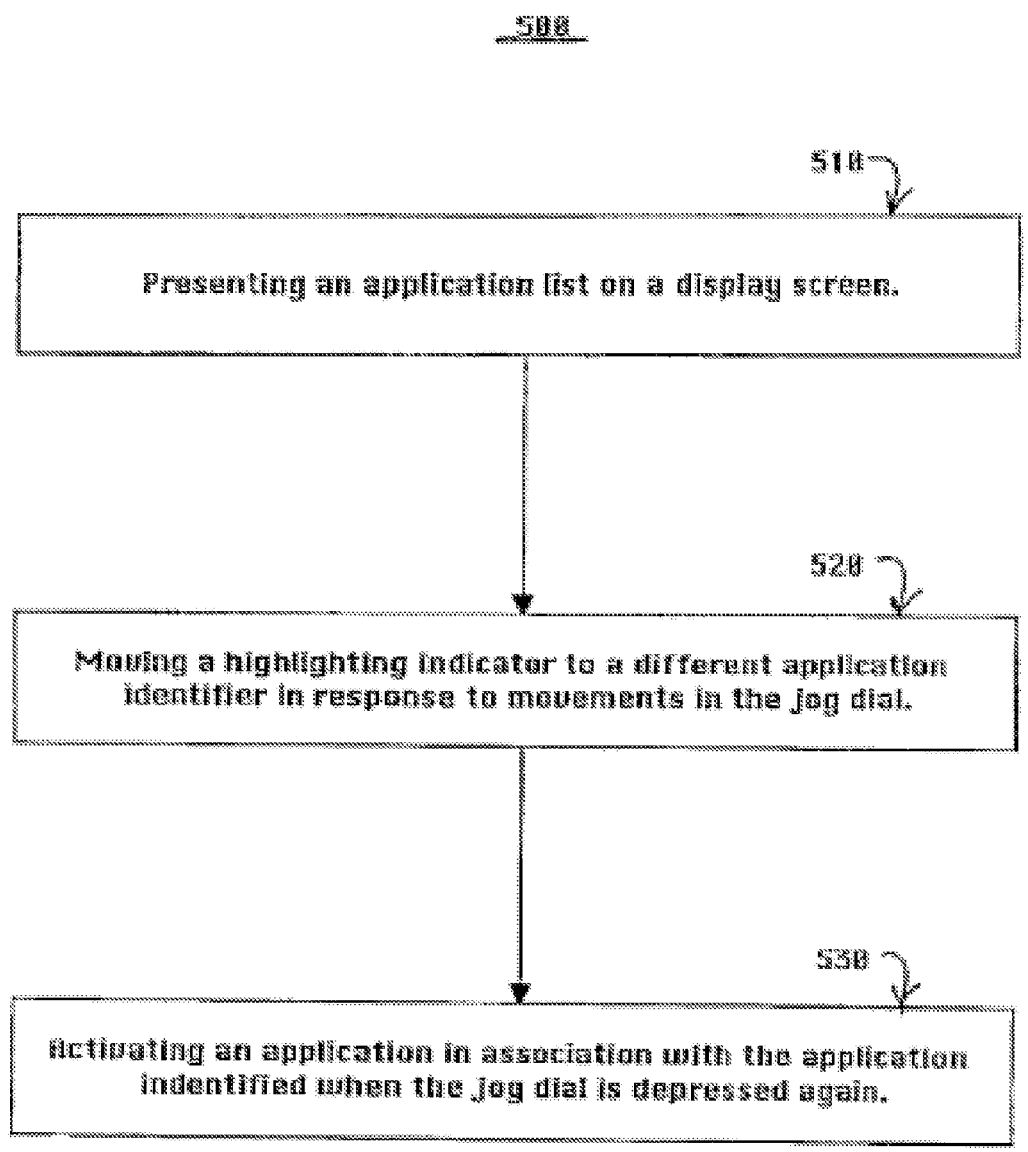

METHOD AND SYSTEM FOR ACTIVATING AN APPLICATION ON A PORTABLE ELECTRONIC DEVICE

RELATED APPLICATIONS

The present application is a continuation of U.S. patent application Ser. No. 09/726,848, filed Nov. 29, 2000, entitled "AN APPLICATION ACCESS AND ACTIVATION SYSTEM AND METHOD," naming Yoon Kean Wong as the inventor, assigned to the assignee of the present invention. This application is incorporated herein by reference in its entirety and for all purposes.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. Electronic systems designed to produce these results are often portable devices such as a palmtop personal digital assistant (PDA) that perform a variety of functions. PDAs usually require the activation of computer program applications to perform these functions. Traditionally, a user is required to use two hands and multiple input mechanisms to activate a palmtop computer application.

As the components required to build a computer system have reduced in size, new categories of computer systems have emerged. One of the new categories of computer systems is the hand held or "palmtop" computer system. A palmtop computer system is a computer that is small enough to be held in the hand of a user and is often "palm-sized." One of the most significant benefits of a palm top computer is mobility. The mobility typically permits a user to utilize the device when traveling away from a fixed location. A user is often engaged in other activities and the easier a hand held computer is to use the easier it is for a user to continue to perform the other activities while using the palmtop computer.

Palmtop computer systems are often used as Personal Digital Assistants (PDAs) to implement various Personal Information Management (PIM) applications such as an address book, a daily organizer, and electronic notepads, to name a few. Even though palmtop computer systems are very small, they typically provide diverse functionality and their capabilities are constantly increasing. A variety of different computer program applications are typically included in a hand held computer and as the computational power and memory capabilities of a hand held computer increase more and more applications are expected to be available for use in a palm top computer. The computer program applications are typically a set of instructions (e.g., software code) that provides directions to the computer associated with performing certain tasks. Adding more applications to palm top computers usually results in user interfaces for accessing and activating the applications that are more congested and complicated.

The relatively small size of a typical handheld computer increases the difficulty of accomplishing a number of operations, including accessing and activating an application. Traditional palmtop computers typically require two hands to operate the PDA. One hand usually supports or holds the PDA while the other hand is utilized to perform selection functions including pushing buttons and pressing on a touch pad. Traditional hand held computers typically include push buttons dedicated to the activation of a particular application. To access and activate a new application the user has to push the button dedicated to the application activation. While dedicated application activation buttons permit some degree of ease of use they are not flexibly adaptable to implementations relying on a variety of applications since each dedicated button is usually limited to a single predefined application.

Traditional computer systems that attempt to add some flexibility for accommodating a variety of applications in a hand held computer typically require a combination of multiple input methods or mechanisms to select and activate an application. Hand held computers often include a home button that when pressed causes a number of application icons to appear on a display screen. Then another input mechanism such as a touch pad is utilized to select and activate a new application. While this application activation approach may provide some flexibility for adding a variety of applications to a hand held computer it still typically requires two hands to activate an application. One hand is typically required to hold the computer while the other hand selects an application by pressing the home button and then pressing a stylus against the icon. Application activation approaches that require the utilization of two different input mechanisms also typically require more manual manipulations that detract from the ease of use.

Traditional hand held computer application activation approaches often prevent the user from multitasking and performing other activities such as operating a cellular phone when opening new applications on a hand held computer. The ability to easily open new applications when talking on a telephone is often a very convenient advantage. For example, the ability to change from an address application which includes telephone numbers to easily open a calendar application to check availability of a meeting time once the telephone conversation has started is often very beneficial. What is required is a system and method that facilitates one handed operation of a hand held computer including application access and activation. The system and method should assist ease of use and assist multitasking capabilities by the user.

SUMMARY OF THE INVENTION

The present invention system and method facilitates one handed operation of a hand held computer including application access and activation. A personal digital assistant application access and activation system and method of the present invention permits a user to hold a PDA in one hand and activate a new application 'with the same hand. In one embodiment of the present invention an application list is presented on a display when a jog dial is depressed for a specific amount of time (e.g., two seconds). In one exemplary implementation of the present invention the application list includes a variety of application titles and application icons representing applications. A highlighting indicator is moved to a different application identifier in response to movements in the jog dial. The highlighted application is activated when the jog dial is depressed again. In one embodiment of the present invention a first application is activated even though a second application is already running. In one exemplary implementation of the present invention an application list includes a cancel indicator for canceling an application access. In yet another exemplary implementation the application list includes an off indicator for turning off the hand held computer.

BRIEF DESCRIPTION OF THE DRAWINGS

FIG. 5 is a flow chart of a personal digital assistant jog dial application activation method in accordance with one embodiment of the present invention.

DETAILED DESCRIPTION OF THE INVENTION

Reference will now be made in detail to the preferred embodiments of the invention, a system and method to activate an application in a personal digital assistant, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention assists efficient and easy activation of applications in a hand held device. The present invention application access and activation system and method facilitates navigation selection through applications of a hand held computer and activation of a selected application. The access and activation system and method increases the functional capabilities of a hand held computer to include access and activation of applications by manipulation of a single input component or method. The present invention application access and activation system and method does not require switching between input components or methods (e.g., using a touch screen when the primary input method is a jog dial) to perform application activation functions. The application access and activation system and method is flexibly adaptable to a variety of implementations, for example a portable or palmtop computer.

Figure 1:
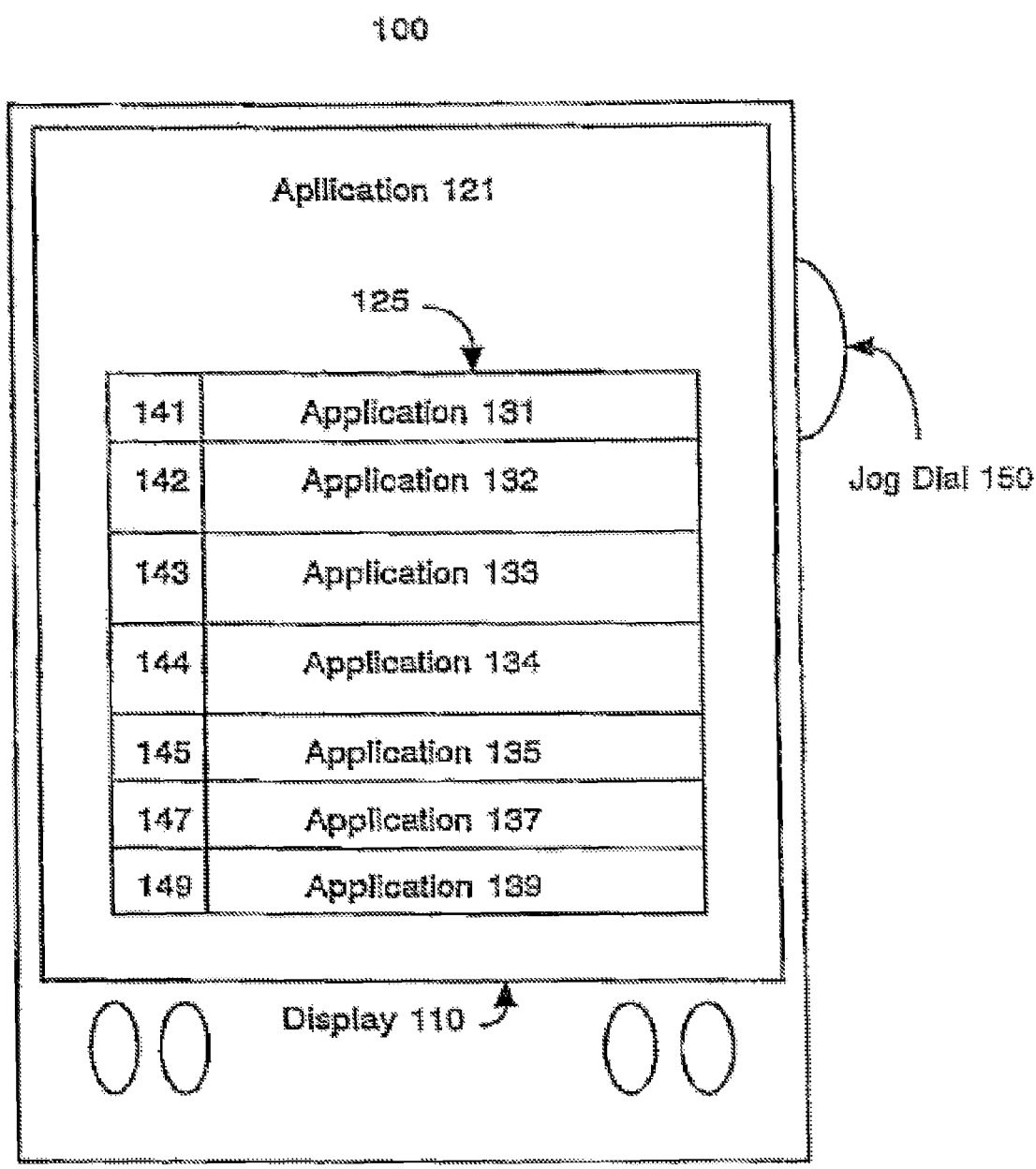
FIG. 1 is an illustration of a personal digital assistant (PDA) jog dial access and application activation system in accordance with one embodiment of the present invention.

FIG. 1 is an illustration of application access and activation system 100 in accordance with one embodiment of the present invention. Application access and activation system 100 facilitates performance of system level operations such as switching to a new application with a single hand. Application access and activation system 100 comprises an input component 150 and a display 110 that includes a navigable application identification graphic such as application list 125. In one embodiment of the present invention, input component 150 is a directional navigation and enter instruction input. component (e.g., a jog dial, joy stick, etc.). Input component 150 provides navigation instructions and enter instructions in response to adjustments or manipulations of input component 150. In one embodiment of the present invention, the navigable application identification graphic includes other OS level operation identifiers or icons in addition to application identifiers. For example, application list 125 comprises application titles 131 through 135 and application icons 141 through 145. Application titles 131 through 135 are titles identifying particular applications. The applications are also identified by application icons 141 through 145 which are readily recognizable graphical images associated with each application.

It is appreciated that a navigable application identification graphic or display of the present invention is readily adaptable to numerous configurations for presenting as level operation identifiers or icons. In one embodiment of the present invention only application titles are provided and in another embodiment only the application icons are provided. Application icons offer the benefit of consuming less space on the display and provide graphic images that are not limited by language constraints. In one exemplary implementation application icon 142 is a image of a telephone and is as easy for a native English speaker to understand as a native Spanish speaker that the phone icon symbolizes a phone communication application. In yet another exemplary implementation of the present invention the application icons are not confined to a list configuration but appear randomly on the display arid directional movements of input component 150 cause a highlight indicator to sequentially highlight the application icons in a predefined order according to the direction of input component 150 movements.

In one embodiment of the present invention application list 125 includes a cancel indication (e.g., cancel indication 137 and cancel icon 147). If the cancel indication is selected (e.g., highlighted when input component 150 is depressed) application list 125 disappears and the display returns to its previous presentation. In one exemplary implementation of the present invention, the computer system continues to run a previously opened application and the display returns to displaying information associated with that application. In one exemplary implementation of the present invention the application list includes an indication "to turn the hand held computer into a low-power/power down mode and a turn off "switch" indicator (e.g., off indicator 139 and off icon 149) to turn the hand held computer off.

The components of application access and activation system 100 cooperatively operate to facilitate as level operations such as application access and activation. When input component 150 is depressed for longer than a specific period of time (e.g., 2 seconds) a navigable application identification graphic comprising as level operation identifiers or icons (e.g., application list 125) appears on display 110. In one exemplary implementation of the present invention, application list 125 appears on display 110 over a running application (e.g., application 121). After the list appears, input component 150 is manipulated in a particular direction resulting in a corresponding movement in a highlight indicator on display 110. The highlight indicator moves from one as level operation identifier or icon to another. In one exemplary implementation of the present invention a jog dial is rotated up or down to cause a corresponding up and down movement of a highlight indicator in application list 125. For example, if application title 133 is highlighted, moving the jog dial up moves the highlight indicator to application title 132 and moving the jog dial down moves the highlight indicator to application title 134. In another exemplary implementation, a joy stick is moved and a highlight indicator moves accordingly from one application identifier or application icon to another.

In one embodiment of the present invention, an application list is accessed by depressing the input component a specific number of times within a short predetermined time period. In one exemplary implementation of the present invention, a jog dial is utilized to move a cursor image shown on a display screen and depressed once to highlight an item when the cursor covers a portion of a desired item displayed on the screen. The jog dial is depressed twice within the predetermined time duration to open the highlighted item. The jog dial is depressed three times within the predetermined time duration to bring up an application list. The jog dial is then rotated until the desired application is highlighted and then the jog dial is depressed twice to activate the desired application.

Figure 2A:
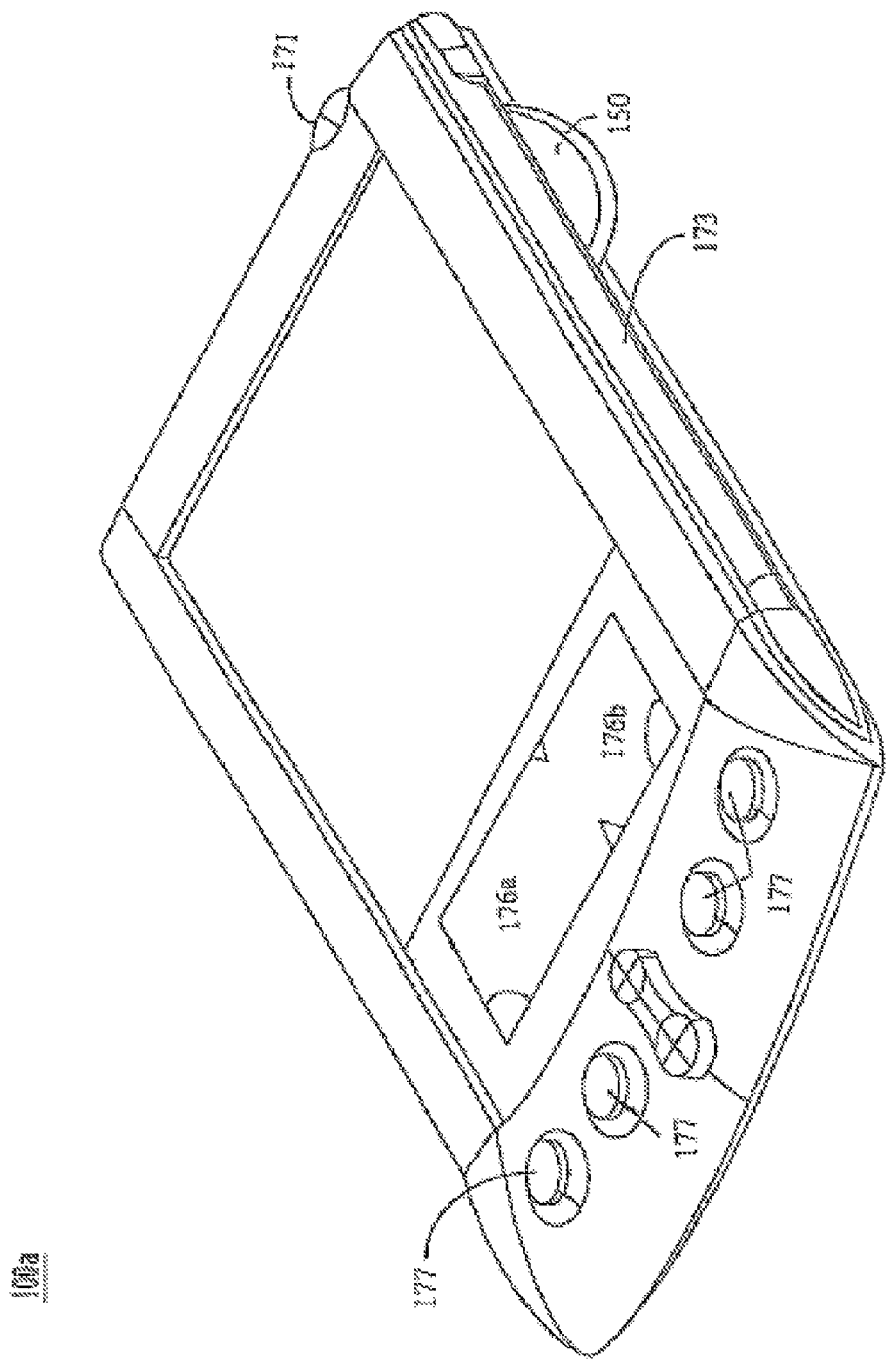
FIG. 2A is a perspective illustration of the top face of one embodiment of a hand held or palmtop computer system.
Figure 2B:
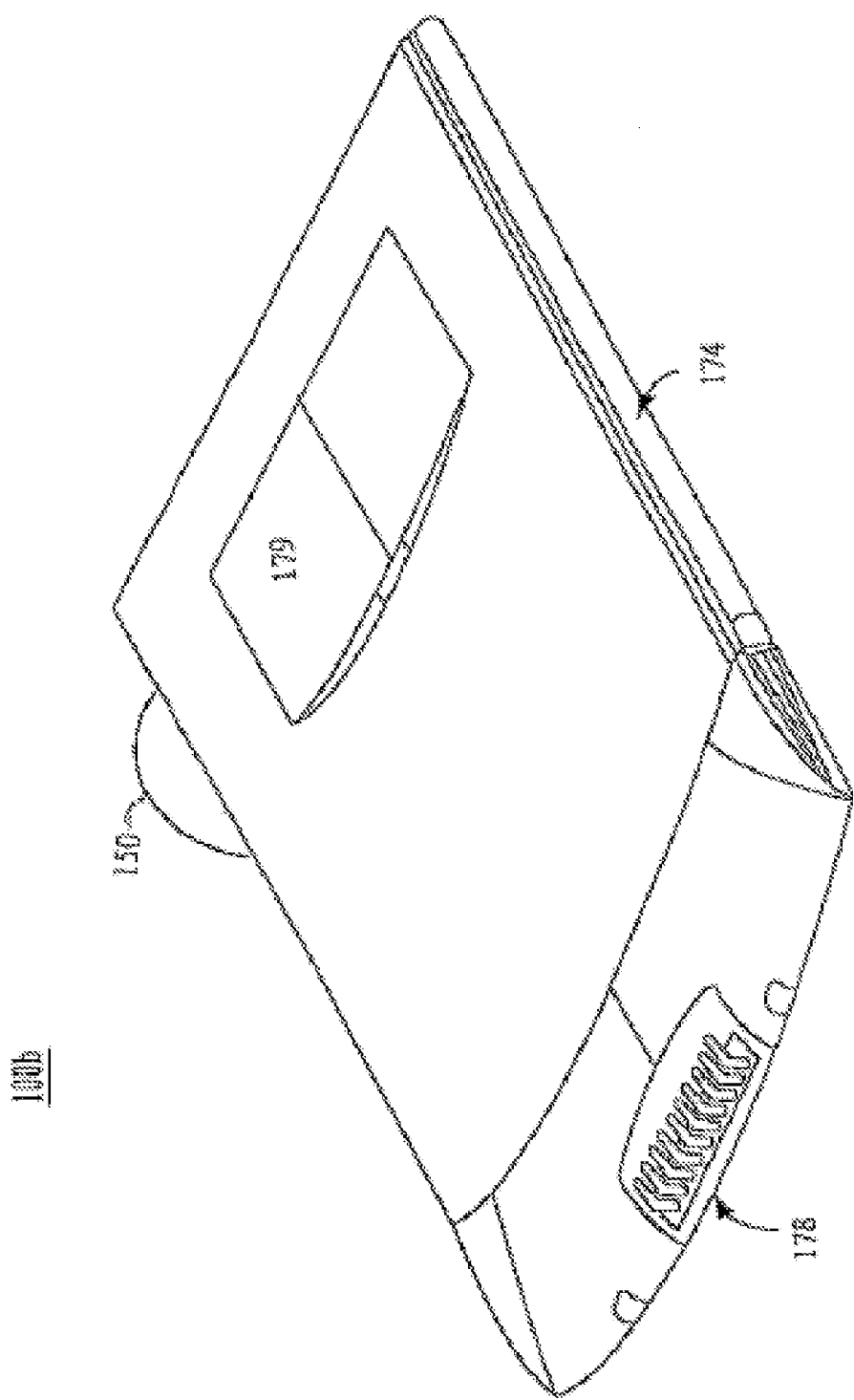
FIG. 2B illustrates the bottom side of one embodiment of a hand held or palmtop computer system.

FIG. 2A is a perspective illustration of the top face 100a of PDA jog dial access and application activation system 100. The top face 100a includes a display screen 110 for displaying images and information to a user. In one embodiment of the present invention display screen 110 is a touch screen able to register contact, for example contact between the screen and the tip of the stylus 173 or a finger. FIG. 2A also shows jog dial 150 for inputting information into the hand held computer including accessing and activating applications. For example, jog dial 150 is depressed for a predetermined period of time resulting in the display of an application list. Then movements in jog dial 150 cause a corresponding movement in a highlight indicator and when jog dial 150 is depressed again the highlighted application is activated.

FIG. 2A also illustrates a handwriting recognition pad or "digitizer" comprising two regions 176a and 176b. Region 176a is for the drawing of alpha characters therein for automatic recognition and region 176b is for the drawing of numeric characters therein for automatic recognition. A removable stylus 173 and on/off button 171 are also shown. The stylus 173 is used for stroking a character within one of the regions 176a and 176b. The stroke information is then fed to an internal processor for automatic character recognition. Once characters are recognized, they are typically displayed on the screen 110 for verification and/or modification. In one embodiment of the present invention stylus 173 is also used to select items when display screen 110 includes touch screen capabilities. The top face 100a also includes one or more dedicated and/or programmable buttons 177 for selecting information and causing the computer system to implement functions. In one embodiment of the present invention, PDA jog dial access and application activation system 100 permits a user to access and activate applications by jog dial 150 and/or other input devices (e.g., dedicated and/or programmable buttons 177, recognition pad regions 176a and 176b, "touch" display screen 110, etc.).

FIG. 1B illustrates the bottom side 100b of one embodiment of a hand held or palmtop computer system. An optional extendible antenna 174, a battery storage compartment door 179, and a serial communication interface 208 are shown. PDA jog dial access and application activation system 100 is utilized to access and activate a number of applications including communication applications. Extendible antenna 174 is utilized for wireless communications (e.g., cellular phone, radio, etc.). Serial communication interface 178 provides a communication port for communications with peripheral devices (e.g., a palm cradle, landline phone modem, etc.). Battery storage compartment door 179 provides access for battery replacement.

Figure 3:
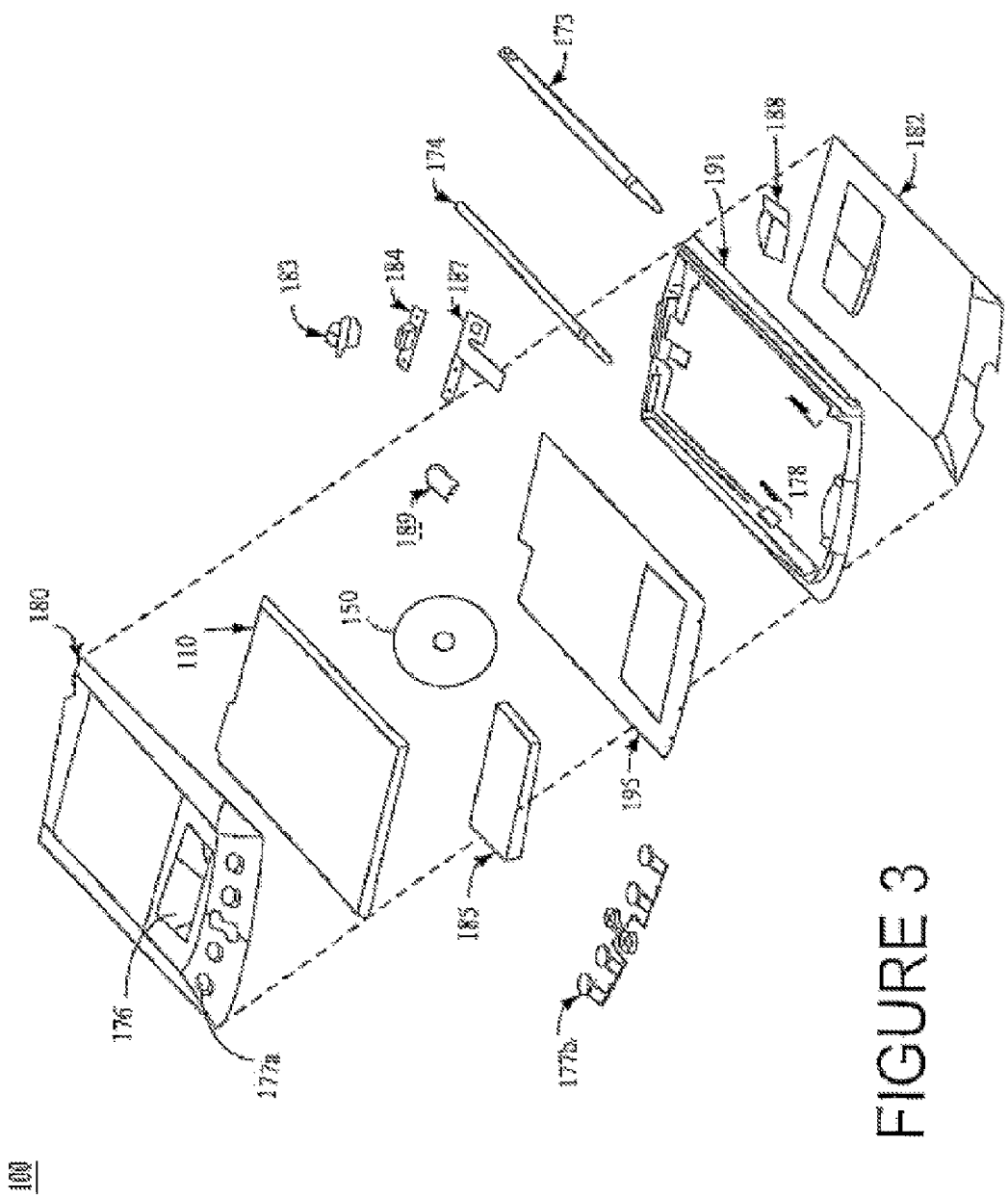
FIG. 3 is an exploded view of a hand held computer system in accordance with one implementation of the present invention.

FIG. 3 is an exploded view of the hand held computer system 100 in accordance with one implementation of the present invention. Hand held computer system 100 includes front cover 180 having an outline of region 176 and holes 177a for receiving buttons 175b. The flat panel display screen 110 (e.g., including a liquid crystal display and touch screen) fits into front cover 180. Any of a number of display technologies can be used (e.g., LCD, FED, Plasma, etc.) for the flat panel display included in display screen 110. A battery 188 provides electrical power. On/off button 183 is shown along with an infrared emitter and detector device 184. A flex circuit 187 is shown along with a PC board 195 containing electronics and logic (e.g., memory, communication bus, processor, etc.) for implementing computer system functionality. The digitizer pad 185 is also included in PC board 195. A midframe 191 for holding stylus 173 and coupling front cover 181 to back cover 182 is also shown. Position adjustable antenna 174 for transmitting and receiving communication signals is shown and radio receiver/transmitter device 189 is also shown between the midframe and the rear cover 182 of FIG. 3. The receiver/transmitter device 189 is coupled to the antenna 2174 and also coupled to communicate with the PC board 195. In one implementation of the present invention, the Mobitex wireless communication system is used to provide two way communication between system 100 and other networked computers and/or the Internet via a proxy server. Communication interface 178 is coupled to PC board 195 and provides a communications port (e.g., a serial port) for communicating signals to and from a peripheral device.

Figure 4A:
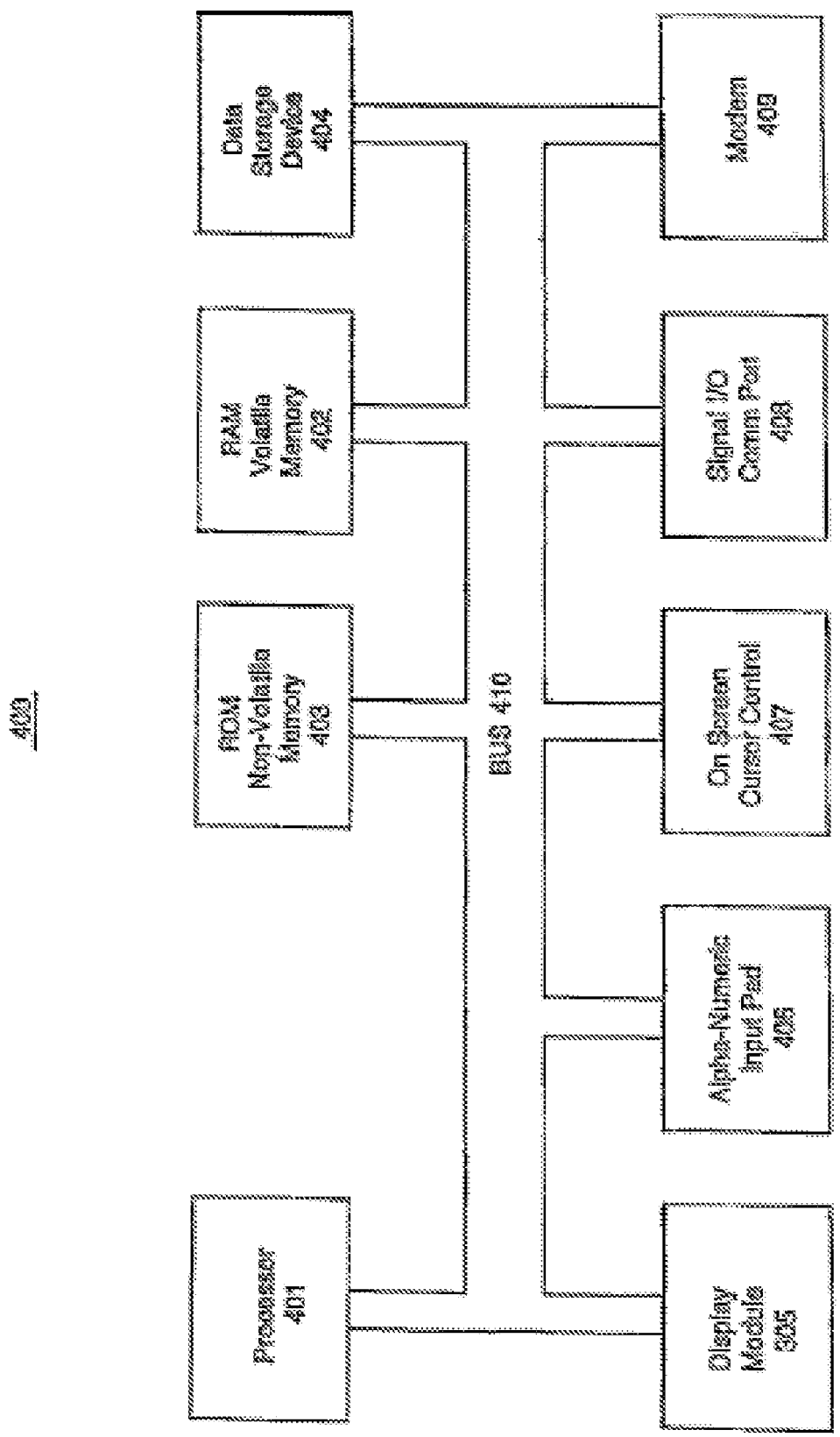
FIG. 4A is a block diagram of a computer system included in one embodiment of the present invention.

FIG. 4A is a block diagram of computer system 400, some of which is 20 implemented on PC board 325. Computer system 400 includes address/data bus 410, central processor 401, volatile memory 402 (e.g., random access memory RAM), non-volatile memory 403 (e.g., read only memory ROM), optional removable data storage device 404 (e.g., memory stick), display module 305 (including wave guide array 220 and light pipe 243), optional alphanumeric input device 406, optional cursor control or directing device 407, and signal communication port 408, modem 409. Address/data bus 410 is coupled to central processor 401, volatile memory 402 (e.g., random access memory RAM), non-volatile memory 403 (e.g., read only memory ROM), optional removable data storage device 404 (e.g., memory stick), display module 305, optional alphanumeric input device 406, optional cursor control or directing device 407, and signal communication port 408, modem 409.

The components of computer system 400 cooperatively function to provide a variety of functions, including PIM, communications, etc. Address/data bus 410 communicates information, central processor 401 processes information and instructions, volatile memory 402 (e.g., random access memory RAM) stores information and instructions for the central processor 401 and non-volatile memory 403 (e.g., read only memory ROM) stores static information and instructions. Optional removable data storage device 404 (e.g., memory stick) also stores information and instructions. Display module 305 displays information to the computer user and an optional alphanumeric input device 406 is an input device, which in one implementation is a handwriting recognition pad ("digitizer") having regions 306a and 306b (see FIG. 3A). Optional directing device 407 also communicates user input information and command selections to the central processor 401 via a touch screen capable of registering a position on the screen of display module 305 where the stylus makes contact. Signal Communication port 408 is a communication interface (e.g., serial communications port 308) for communicating signals to and from a coupled peripheral device (not shown). Modem 400 facilitates communications with other devices.

Figure 4B:
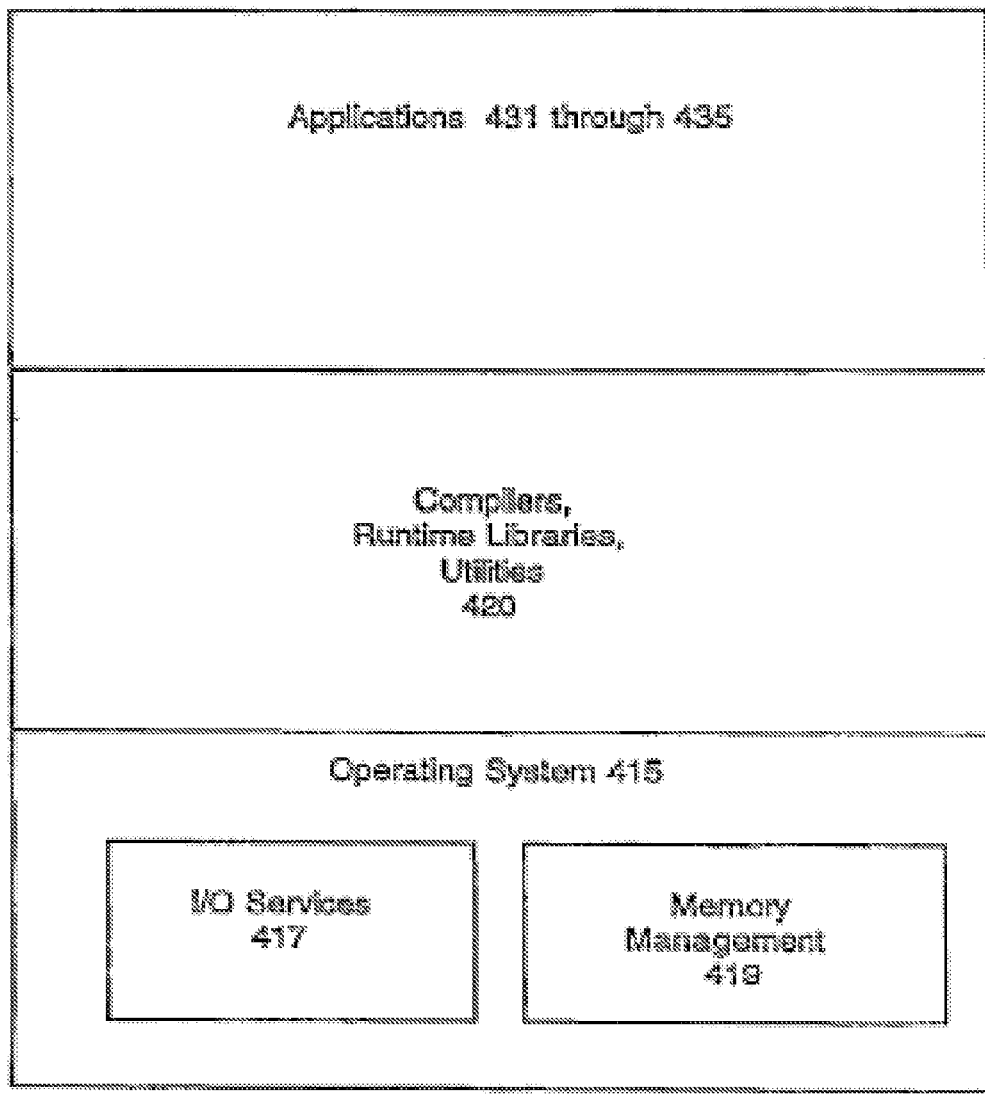
FIG. 4B is a block diagram illustrating a logical view of one embodiment of the software computer program elements of PDA jog dial access and application activation system.

FIG. 4B is a block diagram illustrating a logical view of one embodiment of the software computer program elements of PDA jog dial access and application activation system 100. An operating system 415 (e.g., DOS, UNIX, etc.) provides various system services to other programs executing on the computer system. In one exemplary embodiment, operating system 415 includes input/output (I/O) services 417 and memory management service 419. I/O services 417 facilitate access to I/O devices. Memory management service 419 provides management of allocation and deallocation of memory, including virtual memory addressing or static memory addressing. Also shown are programming language compilers, software tool/utilities and their runtime libraries included in block 420. for application execution.

Applications 431 through 435 shown in FIG. 4B are applications available to run on PDA jog dial access and application activation-system 100 and utilizes the other system services (e.g., operating system 415). Applications 431 through 435 comprise processing procedures performed by PDA jog dial access and application activation system 100 to implement different functions (e.g., communications, calendar, address book, etc.). The different levels of programming shown in FIG. 4B typically reside on a computer readable memory (e.g., a main memory 402, mass storage device 405, etc.) and include instructions for CPU 401. Jog dial 150 is utilized to access and activate applications 431 through 435. In one embodiment of the present invention the application list (e.g., application list 125) includes lines items associated with other operating system (OS) level operations.

FIG. 5 is a flow chart of personal digital assistant operating system function access and activation method 500, one embodiment of the present invention. In one embodiment of the present invention operating system function access and activation method 500 is a PDA application access and activation method. The PDA application access and activation method facilitates efficient access and activation of a software application. Operating system function access and activation method 500 enables greater mobility and assists ease of use.

In step 510 an OS function list (e.g., application list) is presented on a display when an input component (e.g., a jog dial, joystick, etc.) is manipulated in a predetermined manner (e.g., depressed for a specific amount of time). In one embodiment of the present invention, a user depresses a jog dial for a specified period of time (e.g., two seconds) and an application list appears on a display of the PDA. In one embodiment of the present invention, the OS function list (e.g. an application list) includes a variety of OS function identifiers such as application titles and application icons representing applications. In one exemplary implementation of personal digital assistant application access and activation method 500, the OS function list includes an off identifier for turning the personal digital assistant off. The OS function list also includes a cancel identifier for canceling the operating system function access and application activities.

In step 520 a highlighting indicator is moved to a different OS function identifier (e.g., application identifier) in response to manipulation (e.g., movements) in the input component (e.g., a jog dial). In one exemplary implementation of the present invention a user manipulates the input component (e.g., rotates a jog dial) to highlight an OS function identifier (e.g., an application identifier) included in the OS function list (e.g., an application list). In one exemplary implementation of the present invention a jog dial is rotated up to move a highlighter up in the list and down to move the highlighter down the list.

In step 530 a highlighted OS function is activated when the input component (e.g., a jog dial) is manipulated in a predetermined manner (e.g., depressed again). In one exemplary implementation, a user manipulates the input component in the predetermined manner when a desired OS function identifier (e.g., application identifier) is highlighted and that OS function is executed (e.g., the application is activated). In one embodiment of the present invention, a first OS function is performed even though a second OS function is already being performed. For example, a first application is activated even though a second application is already running.

Thus, the present invention system and method facilitates one handed operation of a hand held computer including application access and activation. The present invention application access and activation system and method assists ease of use and mobility of a user when operating a hand held computer. The application access and activation system and method facilitates increased user multitasking capabilities such as operating a hand held computer in one hand including the access and activation of applications and operating another device (e.g., a cellular telephone in the other hand).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of activating an application on a portable electronic device, said method comprising:
    displaying a plurality of elements on a display device of said portable electronic device, wherein each element of said plurality of elements is associated with a respective application of a plurality of applications;
    in response to a first user interaction with a user interface component of said portable electronic device, changing an appearance of a first element of said plurality of elements during execution of a second application, wherein said first element is associated with a first application of said plurality of applications, said first user interaction comprising a user interaction along a first axis; and
    in response to a second user interaction with said user interface component, activating said first application during execution of said second application, said second user interaction comprising a user interaction along a second axis.

2. The method of claim 1, said user interface component comprising a jog dial, said first user interaction comprising a rotation of said jog dial, and said second user interaction comprising a depression of said jog dial.

3. The method of claim 1, said changing an appearance of said first element comprising moving a highlighting indicator to said first element.

4. The method of claim 1, said displaying comprising displaying said plurality of elements over an image associated with said second application, and said displaying comprising displaying said plurality of elements during execution of said second application.

5. The method of claim 1, said displaying comprising displaying said plurality of elements in response to a third user interaction with said user interface component for a predetermined period of time.

6. The method of claim 1, said plurality of elements selected from a group consisting of at least one title and at least one icon.

7. A portable electronic device comprising:
a display device;
a user interface component;
a processor; and
a memory comprising instructions that when executed by said portable electronic device implement a method of activating an application on said portable electronic device, said method comprising:
displaying a plurality of elements on said display device, wherein each element of said plurality of elements is associated with a respective application of a plurality of applications;
in response to a first user interaction with said user interface component, changing an appearance of a first element of said plurality of elements during execution of a second application, wherein said first element is associated with a first application of said plurality of applications, said first user interaction comprising a user interaction along a first axis; and
in response to a second user interaction with said user interface component, activating said first application during execution of said second application, said second user interaction comprising a user interaction along a second axis.

8. The portable electronic device of claim 7, said user interface component comprising a jog dial, said first user interaction comprising a rotation of said jog dial, and said second user interaction comprising a depression of said jog dial.

9. The portable electronic device of claim 7, said changing an appearance of said first element comprising moving a highlighting indicator to said first element.

10. The portable electronic device of claim 7, said displaying comprising displaying said plurality of elements over an image associated with said second application, and said displaying comprising displaying said plurality of elements during execution of said second application.

11. The portable electronic device of claim 7, said displaying comprising displaying said plurality of elements in response to a third user interaction with said user interface component for a predetermined period of time.

12. The portable electronic device of claim 7, said plurality of elements selected from a group consisting of at least one title and at least one icon.

13. A portable electronic device comprising:
means for displaying a plurality of elements on a display device of said portable electronic device, wherein each element of said plurality of elements is associated with a respective application of a plurality of applications;
means for changing, in response to a first user interaction with a user interface component of said portable electronic device, an appearance of a first element of said plurality of elements during execution of a second application, wherein said first element is associated with a first application of said plurality of applications, said first user interaction comprising a user interaction along a first axis; and
means for activating said first application during execution of said second application in response to a second user interaction with said user interface component, said second user interaction comprising a user interaction along a second axis.

14. The portable electronic device of claim 13, said user interface component comprising a jog dial, said first user interaction comprising a rotation of said jog dial, and said second user interaction comprising a depression of said jog dial.

15. The portable electronic device of claim 13, said means for changing an appearance of said first element comprising means for moving a highlighting indicator to said first element.

16. The portable electronic device of claim 13, said means for displaying comprising means for displaying said plurality of elements over an image associated with said second application, and said means for displaying comprising means for displaying said plurality of elements during execution of said second application.

17. The portable electronic device of claim 13, said means for displaying comprising means for displaying said plurality of elements in response to a third user interaction with said user interface component for a predetermined period of time.

18. The portable electronic device of claim 13, said plurality of elements selected from a group consisting of at least one title and at least one icon.

* * * * *